United States Patent [19]

Peschl

[11] Patent Number: 4,615,404

[45] Date of Patent: Oct. 7, 1986

[54] SYSTEM FOR MEASURING CONTAINER WEIGHT IN THE FIELD INDEPENDENT OF WIND LOAD

[76] Inventor: Ivan A. S. Z. Peschl, 8, Kennedylaan, Sterksel, Netherlands

[21] Appl. No.: 581,253

[22] Filed: Feb. 17, 1984

[51] Int. Cl.$^4$ .................... G01G 19/52; G01G 21/24
[52] U.S. Cl. .................................... 177/132; 177/255
[58] Field of Search ............... 177/132, 255, 133, 142

[56] References Cited

U.S. PATENT DOCUMENTS

| | | | |
|---|---|---|---|
| 4,029,163 | 6/1977 | Allen | 177/255 |
| 4,085,850 | 4/1978 | Heltzel | 177/255 X |
| 4,344,495 | 8/1982 | Kovacs | 177/255 X |
| 4,481,985 | 11/1984 | Bruder et al. | 177/255 X |

*Primary Examiner*—George H. Miller, Jr.
*Attorney, Agent, or Firm*—Stiefel, Gross, Kurland & Pavane

[57] ABSTRACT

A horizontal load independent field measuring system for containers comprising a triangular latticework structure (20), the nodal points (2,4) of which are arranged in two concentric circles, one (2) adjacent the container (1) being weighed and the other (4) adjacent the foundation, with the latticework (20) being formed of support bars (3) arranged in isosceles triangles. The sum of the bar (3) forces is independent of the horizontal forces acting on the container (1). Pairs of bridges (6,7) span between respective pairs of support bars (3,3-30) comprising a given triangle with a reference bar (5) being mounted between these bridges (6,7) and symmetrically disposed between the support bars (3). A displacement transducer (9) is associated with the reference bar (5) which is slidingly connected to the upper bridge (7) in order to measure the displacement of the upper bridge (7) against the unloaded reference bar (5) which corresponds to the average deformation of the associated support bars (3). The sum of these average deformations for each of the reference bars (5) in the structure (20) corresponds to the vertical load or weight of the container (1) independent of horizontal force. The measurement may also be made temperature independent by making the reference bar (5) from the same material, shape and thickness as the support bars (3) so as to have the same thermal characteristics.

7 Claims, 6 Drawing Figures

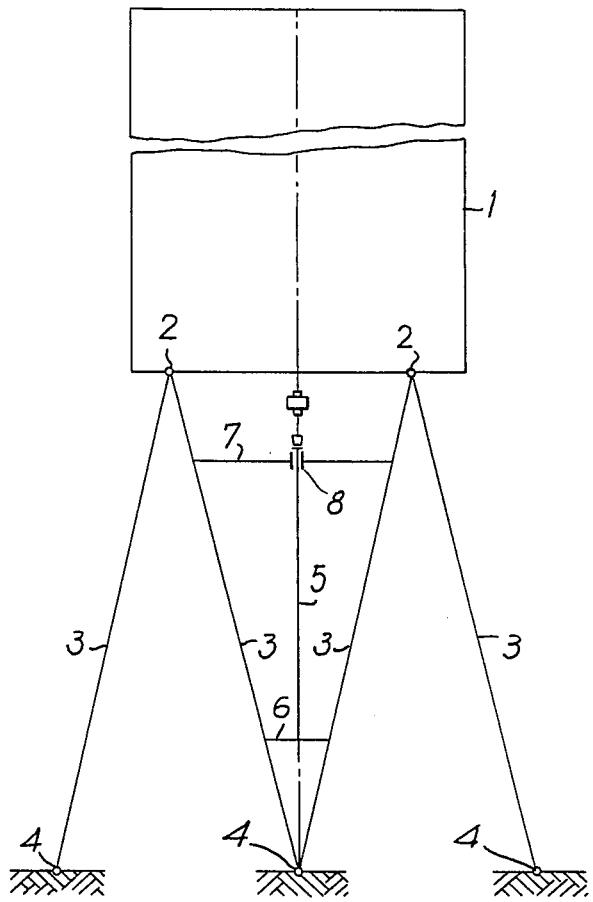
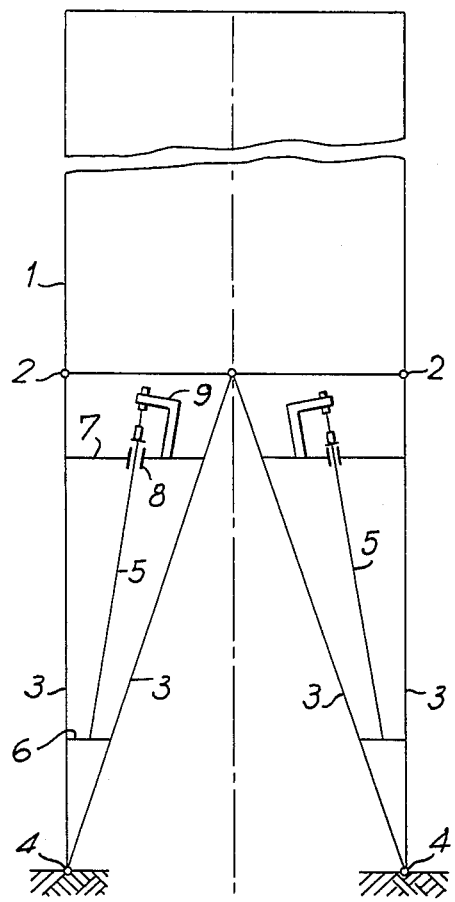
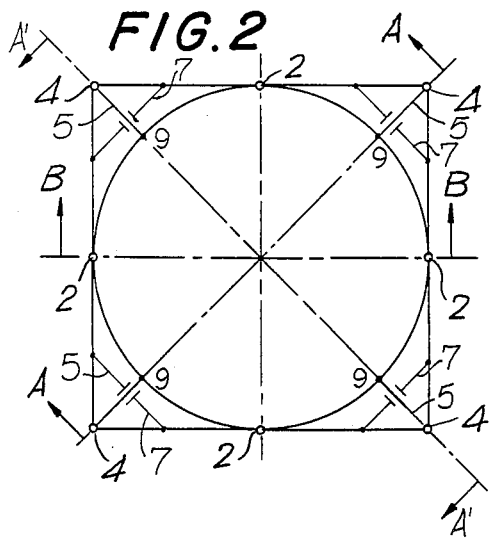
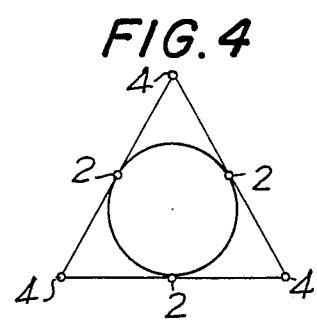
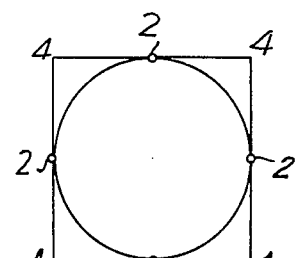
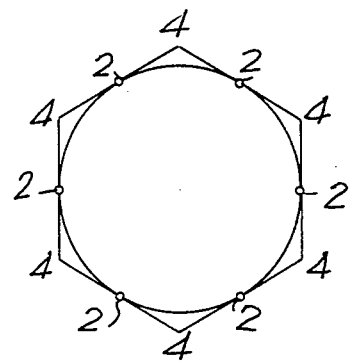

SYSTEM FOR MEASURING CONTAINER WEIGHT IN THE FIELD INDEPENDENT OF WIND LOAD

TECHNICAL FIELD

The present invention relates to measurement systems for use in the field for measuring container weight independent of wind load.

BACKGROUND ART

Load cells are well known in the prior art for measuring container weight in the field for bins, silos, tanks, vessels and other such containers. However, such prior art load cells can only load in one direction, namely vertically, through the application of positive force. Thus, accuracy of the measurement of such load cells may be significantly affected by horizontal wind forces, and other factors, which occur in the field where such measurements, such as for silos, are normally taken. Consequently, these disadvantages are overcome by the present invention which provides a weight measurement system which is independent of horizontal forces such as due to wind, and which is also temperature independent, both of which are disturbing factors which can occur in the field and affect the accuracy of the weight measurement.

DISCLOSURE OF THE INVENTION

The measuring system of the present invention comprises supporting structure consisting of a triangular latticework the nodal points of which are arranged in two concentric circles lying one above the other, with one of the circles being disposed on the bottom of the container whose weight is being measured and the other of the circles being disposed on the ground or foundation. The latticework is formed of bars arranged in isosceles triangles with the nodal points, as previously mentioned, lying alternately on the container and on the foundation.

In accordance with the system of the present invention, the sum of the bar forces is independent of the force acting horizontally on the container, such as the force of the wind for instance, and the sum of the changes in length of the latticework bars is used for measuring the weight of the container and its content on the ground in the field, such measurement not being affected by wind forces. In order to determine these changes in length, a reference measurement bar is mounted between two triangularly arranged supports, with the reference measurement bar indicating the average value of the increases in length of a pair of supports or latticework bars. In order to make the system temperature independent, the reference bars are dimensioned so that they have the same thermal capacitance and the same thermal expansion as the latticework or support bars. This may be achieved, for instance, by forming the reference bars from the same material and of the same dimensions as the latticework or support bars. Upper and lower holders or bridges for the reference bars extend between pairs of support bars with the reference bar being fixed to the lower holder and slidingly connected to the upper holder. The holders follow the deformation of the support bars. The bearing point for the reference bar on the upper holder is located between the supports at a point which represents the average value of deformation of the pair of supports. A displacement transducer mounted at this bearing point measures the displacement of the bearing point with respect to the reference measuring bar which measurement is calibrated to provide the corresponding weight measurement of the container. In addition, the support construction can be anchored firmly to the foundation so that any moments and horizontal forces can be lead away by the anchoring.

BRIEF DESCRIPTION OF THE DRAWINGS

FIG. 1 is a diagrammatic illustration of a typical vertical plane in the latticework structure of the measuring system of the present invention taken along perpendicular line A'A of FIG. 2, this view being similar and typical to that taken along line A'—A' of FIG. 2, with the support bars being acted on in compression;

FIG. 2 is a diagrammatic illustration of a plan view of the system of FIG. 1;

FIG. 3 is a diagrammatic illustration similar to FIG. 1, of another vertical plane of the system of FIG. 1 taken along diagonal line B—B of FIG. 2; and FIGS. 4–6 are diagrammatic illustrations similar to FIG. 2 of alternatives of an optimal latticework structure in accordance with the present invention.

BEST MODE FOR CARRYING OUT THE INVENTION

Referring now to the drawings in detail, and initially to FIGS. 1 and 2, the container 1, to be weighed is preferably connected to the supporting latticework or structure, generally referred to by the reference numeral 20 at upper support points 2, with the number of upper support points 2 preferably comprising at least three uniformly spaced apart points.

Pairs of supporting bars 3 of the supporting latticework structure 20 preferably form isosceles triangles between the upper support point 2 and lower support points 4, with the apices of the isosoles triangles preferably being at lower support point 4 as shown in FIGS. 1 and 3. The bars 3 of the supporting latticework structure 20 are preferably arranged in such a manner that in each case one pair of bars 3 extending from upper support point 2 to lower support point 4 are in the same vertical plane as shown, by way of example, in FIGS. 1 and 3. As a result, the sum of all of the bar 3 forces as a result of a horizontal force such as due to a wind load, is equal to zero in the vertical direction so that these horizontal forces are cancelled out and cannot exert any influence on the vertically measured weight value of the container 1.

As shown and preferred in FIGS. 1 and 3, a pair of holders or bridges 6 and 7 span between a pair of support bars 3 with a reference measuring bar 5 extending between these bridges 6 and 7. Preferably the reference measuring bar 5 is fixedly mounted to the lower holder or bridge 6 of the pair and is slidingly connected to the upper holder or bridge 7. In addition, the reference bars 5 preferably have the same dimensions and are formed of the same material as the support bars 3 so as to provide a temperature independent measurement. Moreover, the bridges 6 and 7 in the latticework 20 of the present invention follow the deformation of the support bars 3 which they span between. The reference bar 5 is slidingly connected to the upper bridge 7 at a bearing point 8 which is preferably symmetrically disposed between the respective pair of support bars 3 at a point which represents the average value of the deformation (change in length) of the corresponding pair of support bars 3. The displacement of the reference bar 5 bearing point 8, which is calibrated to correspond to weight, is utilized to measure the weight of the container 1. This is preferably accomplished by mounting a conventional displacement transducer 9 at the bearing point 8, with the displacement transducer 9 following the movement or displacement of the beam or upper bridge 7 and measuring the displacement of the bearing point 8 with respect to the reference measuring bar 5.

The nodal points of the triangular latticework structure 20, as shown in FIG. 2, are arranged in two concentric circles, one above the other with nodal points 2 being on the upper circle and nodal points 4 being on the lower circle. As previously mentioned, at least three such nodal points exist on each circle with the overall latticework structure 20 being substantially symmetrical. Thus, the system of the present invention measures the average deformation from each of the bridges 7 of the support bar 3 pairs whose sum equals the vertical load or weight of the container 1 independent of any horizontal force or load. In this regard it should be noted that the support bars 3 which are angled in FIG. 1, for example, given additional reference numeral 30, take the horizontal loading to provide a resultant of zero in the vertical direction, whereas any horizontal moment is cancelled by the vertically oriented support bars 3 to yield no resultant vertical loading therefrom.

Summarizing the above, with reference to FIG. 1 for example, the reference bar 5 prior to measurement comprises an unloaded bar with the amount of movement of the upper bridge 7 against this unloaded bar 5 providing a measurement of the average deformation of the corresponding support bar pairs 3, 3-30. Since the unloaded bar 5 is made from the same material, shape and thickness as the loaded bars 3, it has the same temperature characteristics, resulting in a weight measurement in the field which is independent of temperature and horizontal load.

If desired the latticework support structure 20 can be arranged so that the container 1 is suspended from the support bars 3. The supports 3 in such a case would be stressed in tension, which may lead to an easier development of the support bars 3 and, thus, to a greater precision in measurement. Moreover, if desired, the measuring device may also be mounted on each support bar 3. In any event, the above measuring system of the present invention may work for a polygonal latticework structure as long as at least three support bars are employed to measure vertical loading or weight of the container and as long as the latticework structure is substantially symmetrical.

In the optimal design case presently contemplated, support bars (3) are vertical and the horizontal forces acting in points 2 and 4 are *MINIMAL*. This will occur if the points 4 will be formed by points of intersection of tangents going through points 2 such as illustrated in FIGS. 4–6.

It is to be understood that the above described embodiment of the invention is merely illustrative of the principles thereof and that numerous modifications and embodiments of the invention may be desired within the spirit and scope thereof.

What is claimed is:

1. A latticework support structure and measuring system for measuring the weight of a container in the field independent of horizontal load, said system comprsing at least three pairs of support bars arranged in isosceles triangles, the nodal points of said triangles comprising support points arranged, respectively, in upper and lower concentric circles one above the other, with the upper circle being disposed adjacent said container and with the lower circle being disposed adjacent on a supporting foundation, the upper and lower support points of each pair of support bars forming one of said isosceles triangles arranged in a vertical plane, said latticework structure support bars being capable of taking horizontal loading and moments and yielding no resultant vertical loading therefrom for providing a vertical load independent of horizontal load on said container; and means for measuring the vertical displacement of said latticework structure for providing a measurement corresponding to the weight of said container.

2. A measuring system in accordance with claim 1 further comprising a pair of vertically spaced apart horizontal beams bridging a pair of support bars of a given isosoles triangle for providing an upper bridge beam and a lower bridge beam, said measuring means comprising an unloaded reference bar fixedly connected to said lower bridge beam and slidingly connected to said upper bridge beam at a bearing point disposed along the axis of symmetry between said support bars of said given triangle.

3. A measuring system in accordance with claim 2 wherein said measuring means further comprises means connected to said reference bar for measuring the displacement between said bearing point of the reference bar and said reference bar for providing a measurement of the amount of displacement of said upper bridge beam against said unloaded reference bar corresponding to the average deformation of the support bars comprising said given triangle.

4. A measuring system in accordance with claim 3 wherein respective pairs of said vertically spaced apart horizontal beams bridge each of a plurality of respective pairs of support bars comprising respective given triangles in said latticework structure, with each of said respective pairs of bridge beams having a respective associated measuring means comprising an associated unloaded reference bar fixedly connected to the lower bridge beam thereof and slidingly connected to the upper bridge beam thereof at a bearing point disposed along the axis of symmetry between said respective pair of support bars with each of said associated measuring means further comprising means connected to said associated reference bar for measuring the displacement between said bearing point of the reference bar and said reference bar for providing a measurement of the amount of displacement of said upper bridge beam against said unloaded reference bar corresponding to the average deformation of the respective support bars comprising said respective given triangle, the sum of the average deformation from each of said respective upper bridges associated with said respective given triangles comprising the vertical load on said latticework structure independent of horizontal load.

5. A system in accordance with claim 2, 3 or 4 wherein said reference bar has the same thermal capacity and the same temperature coefficient of expansion as said support bars, whereby said field measurement is independent of temperature.

6. A system in accordance with claim 1, 2, 3 or 4 wherein said container is supported by said support structure with said support bars being acted on in compression.

7. A system in accordance with claim 1, 2, 3 or 4 wherein said container is supported in a suspended manner by said latticework support structure with said support bars acted on in tension.

* * * * *

UNITED STATES PATENT AND TRADEMARK OFFICE
CERTIFICATE OF CORRECTION

PATENT NO. : 4,615,404

DATED : October 7, 1986

INVENTOR(S) : Ivan A.S.Z. Peschl

It is certified that error appears in the above-identified patent and that said Letters Patent is hereby corrected as shown below:

In column 2, line 13: change "A'A" to --A-A--;
In column 2, line 38: change "isosoles" to --isosceles--;
In column 3, line 53: change "minimal" to --<u>minimal</u>--;
In column 3, line 55: Add --the alternative <u>of</u>-- after "in";
In column 4, line 17: change "isosoles" to --isosceles--.

Signed and Sealed this

Fifth Day of January, 1988

Attest:

DONALD J. QUIGG

*Attesting Officer*

*Commissioner of Patents and Trademarks*